US009678389B2

(12) United States Patent
Wu et al.

(10) Patent No.: US 9,678,389 B2
(45) Date of Patent: Jun. 13, 2017

(54) MULTI-DOMAIN LIQUID CRYSTAL DISPLAY PANEL AND METHOD FOR PREPARING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaojuan Wu, Beijing (CN); Kaixuan Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 175 days.

(21) Appl. No.: 14/525,718

(22) Filed: Oct. 28, 2014

(65) Prior Publication Data
US 2015/0331287 A1   Nov. 19, 2015

(30) Foreign Application Priority Data

May 19, 2014   (CN) .......................... 2014 1 0211445

(51) Int. Cl.
*G02F 1/00*   (2006.01)
*G02F 1/1337*   (2006.01)

(52) U.S. Cl.
CPC .. *G02F 1/133753* (2013.01); *G02F 1/133788* (2013.01); *G02F 2202/025* (2013.01)

(58) Field of Classification Search
CPC ...................... G02F 1/133753; G02F 1/133757
See application file for complete search history.

(56) References Cited

U.S. PATENT DOCUMENTS 4,844,835 A * 7/1989 Uchida ................... C08F 20/30
                                                        252/299.01
2005/0249257 A1   11/2005 Leyrer et al.
(Continued)

FOREIGN PATENT DOCUMENTS

CN        1489706 A    4/2004
CN      101387792 A    3/2009
(Continued)

OTHER PUBLICATIONS

Office Action dated Mar. 1, 2016 issued in corresponding Chinese Application No. 201410211445.4.

*Primary Examiner* — Anne Hines
(74) *Attorney, Agent, or Firm* — Nath, Goldberg & Meyer; Joshua B. Goldberg

(57) ABSTRACT

Disclosed are a multi-domain liquid crystal display panel comprising an upper substrate and a lower substrate, wherein at least one of the substrates includes a glass substrate, a conventional alignment layer coated on the surface of the glass substrate, and a polymer alignment layer having a different alignment direction from that of the conventional alignment layer and a method for preparing the same. In the present invention, a smectic/cholesteric liquid crystal polymer is formed from the mixture of liquid crystal polymerizable monomers having smectic phase (Sm)-cholesteric phase (N*) transition, and multiple liquid crystal alignments in a single pixel are formed by adjusting the polymerization temperature, the thickness of the polymer layer, and the amount of the smectic liquid crystal polymerizable monomer, thereby realizing a multi-domain display by the subsequent masking treatment and ultraviolet irradiation. The method for preparing the same is simple, novel, low-cost, and easy to achieve.

20 Claims, 6 Drawing Sheets

(56) References Cited

U.S. PATENT DOCUMENTS

| | | | |
|---|---|---|---|
| 2005/0249889 A1 | 11/2005 | Hammond-Smith et al. | |
| 2009/0098313 A1* | 4/2009 | Mitov | C09K 19/02 |
| | | | 428/1.1 |
| 2010/0117027 A1 | 5/2010 | Hirai et al. | |
| 2010/0208183 A1* | 8/2010 | Kim | C09K 19/12 |
| | | | 349/124 |
| 2016/0238763 A1* | 8/2016 | Xiong | G02F 1/1333 |

FOREIGN PATENT DOCUMENTS

| | | |
|---|---|---|
| CN | 101646695 A | 2/2010 |
| CN | 102508378 A | 6/2012 |
| JP | 3531905 B2 | 5/2004 |

\* cited by examiner

MULTI-DOMAIN LIQUID CRYSTAL DISPLAY PANEL AND METHOD FOR PREPARING THE SAME

FIELD OF THE INVENTION

The present invention relates to the technical field of liquid crystal display and, in particular, to a multi-domain liquid crystal display panel and a method for preparing the same.

BACKGROUND

Liquid crystal display (LCD) devices have been increasingly used in recent daily lives, such as mobile phone display screens, notebook display screens, GPS display screens, LCD TV display screens and the like. Along with the development of sciences and techniques, conventional mono-domain LCD devices could not meet the increasing requirements of LCD devices any more, due to their drawbacks including low contrast ratio, asymmetric viewing angle, shift in color when viewing images from various angles, and the like. Recently, multi-domain display technique has been widely used in the display field, because it can improve the asymmetric viewing angle of LCD devices, increase the viewing angle, enhance the contrast ratio, improve the grayscale reversal, effectively improve the color shift, and the like.

Many patent literatures have disclosed the studies conducted for the purpose to achieve the multi-domain display of LCD devices. For example, one way to achieve the multi-domain display includes dividing a pixel of a LCD device into four sub-pixels, and then rubbing respectively in the four sub-pixel regions to make liquid crystal molecules form different primary alignments, which will form a multi-domain state when a voltage is applied. Alternatively, the multi-domain display may be achieved by preparing several protrusions under the pixel electrode, and establishing an oblique electric field between the pixel electrode having a particular shape and the common electrode on the upper glass substrate to align liquid crystal molecules along the electric field direction to form a multi-domain state. Also, the multi-domain display may be achieved by configuring a multi-domain type pixel electrode. However, the manufacturing process of the multi-domain film LCD device is complicated and difficult, and the manufacturing cost is high.

The conventional method which achieves multi-domain display by forming different primary alignments of liquid crystal molecules in a pixel through a rubbing alignment technique involves complicated manufacturing process and relatively high cost, and it is not so easy to achieve the desired effect.

In view of the above, it is desired to provide a simple and low-cost method for achieving multi-domain display by forming multiple liquid crystals with different alignments in a pixel.

SUMMARY OF THE INVENTION

An objection of the present invention is to provide a novel and simple multi-domain liquid crystal display panel in which multiple liquid crystal alignments are formed in a pixel by a smectic/cholesteric liquid crystal polymer so as to achieve multi-domain display.

The object described above is achieved by the following technical solutions of the present invention:

a multi-domain liquid crystal display panel comprising, as shown in FIG. 1, an upper substrate and a lower substrate, wherein at least one of the substrates includes a glass substrate, a first alignment layer coated on the surface of the glass substrate, and a polymer alignment layer having a different alignment direction from that of the first alignment layer.

The glass substrate is an ITO conductive glass substrate.

As the first alignment layer (5 as shown in FIG. 1), for example, a polyimide (referred to as PI) alignment layer, a polyvinyl alcohol (referred to as PVA) alignment layer or a photo alignment layer (such as a PI alignment layer containing photoresponse materials) and the like can be exemplified, and the first alignment layer are aligned in a certain direction by methods of rubbing, photo-alignment, etc.

The polymer alignment layer is formed by coating the mixture of a smectic liquid crystal polymerizable monomer, a cholesteric liquid crystal polymerizable monomer and a photoinitiator on the first alignment layer, and followed by a masking treatment and ultraviolet light irradiation polymerization in sequence.

The mass ratio of the smectic liquid crystal polymerizable monomer and the cholesteric liquid crystal polymerizable monomer is 20~80:80~20, further preferably 40~60:60~40.

The mass of the photoinitiator is 4%~6% of the total mass of the smectic liquid crystal polymerizable monomer and the cholesteric liquid crystal polymerizable monomer.

The smectic liquid crystal polymerizable monomer is 2-methylbutyl-4'-(4-(6-(acryloyloxy)hexyloxy)benzoyloxy)biphenyl-4-carboxylic ester represented by the following formula:

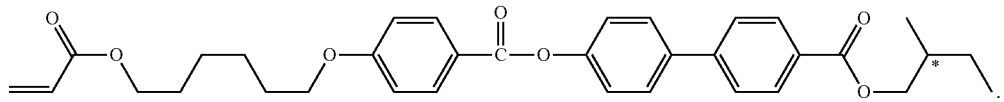

The cholesteric liquid crystal polymerizable monomer is 1,4-bis(4-((3-methyl-6-acryloyloxy)hexyloxy)benzoyloxy)benzene represented by the following formula:

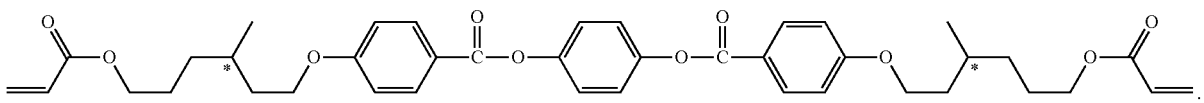

The photoinitiator is ultraviolet photoinitiator, which is preferably benzoin dimethyl ether represented by the following formula:

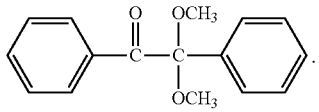

The masking treatment is not particularly limited, and the conventional treatment process in liquid crystal field may be adopted. During the polymerization according to the present invention, the polymer alignment layer and the first alignment layer may exist alternatively, it should be noted however, that the present invention is not limited thereto and other combination of the polymer alignment layer and the first alignment layer may also be designed, and the width of the polymer alignment layer is adjustable.

As a preferred embodiment of the present invention, the masking treatment is performed by dividing the liquid crystal mixture layer in a pixel uniformly into multiple modules and disposing the masks at intervals so as to form different primary alignments of liquid crystal molecules in a pixel, the top view of the modules is shown in FIG. 11, in a subsequent step.

As shown in FIG. 6(a), in the case where the width of each module in the alignment layer containing a smectic/cholesteric liquid crystal polymer (hereafter also referred to as the polymer alignment layer) is half of that of a single pixel, half of the liquid crystal molecules in a single pixel will contact directly with the first alignment layer and another half of the liquid crystal molecules contact directly with the alignment layer containing a smectic/cholesteric liquid crystal polymer, thereby forming two kinds of primary alignments of liquid crystal molecules, i.e. two-domain liquid crystal display is achieved.

As shown in FIG. 6(b), in the case where the width of each module in the polymer alignment layer is one-third of a single pixel, one or two modules at intervals containing a smectic/cholesteric liquid crystal polymer may exist in that pixel, so that the modules in the first alignment layer and the modules in the polymer alignment layer distribute alternatively in a pixel, thereby forming three kinds of primary alignments of liquid crystal molecules, i.e. three-domain liquid crystal display is achieved. Similarly, as shown in FIG. 6(c), in the case where the width of each module in the polymer alignment layer is one-sixth of a single pixel, the modules in the first alignment layer and the modules in the polymer alignment layer distribute alternatively in that pixel, thereby forming six kinds of primary alignments of liquid crystal molecules, i.e. six-domain liquid crystal display is achieved.

In the present invention, the width of each module in the alignment layer containing a smectic/cholesteric liquid crystal polymer is designed to be 1/n of a single pixel, wherein n is an integer of 2~30, so that the modules in the first alignment layer and the modules in the polymer alignment layer distribute alternatively in that pixel, thereby n kinds of primary alignments of liquid crystal molecules can be formed in a subsequent step, i.e. multi-domain liquid crystal display can be achieved, as shown in FIG. 6(d). Preferably, n is an integer of 3~8. The specific size of each module can be adjusted by changing the size of a mask.

In the above polymerization, the UV irradiation conditions are: light intensity of 3~40 mw/cm$^2$, and duration of irradiation of 5-60 min.

In the above polymerization, the polymerization temperature is $T_{Sm-N*} \pm 3°$ C. ($T_{Sm-N*}$ being the phase transition temperature of the mixture of the smectic liquid crystal polymerizable monomer, the cholesteric liquid crystal polymerizable monomer and the photoinitiator (hereinafter also referred as the mixture)) or in the temperature range that the mixture is in cholesteric state.

In the present invention, the alignment direction of the surface molecules in the alignment layer containing a smectic/cholesteric liquid crystal polymer (i.e. the alignment direction thereof) may be adjusted by changing the amount of the smectic liquid crystal polymerizable monomer in the mixture, the polymerization temperature, and the thickness of the alignment layer containing the mixture.

The smectic (Sm) liquid crystal polymerizable monomer, the cholesteric (N*) liquid crystal polymerizable monomer and the photoinitiator are mixed to obtain a liquid crystal monomer mixture having Sm-N* phase transition temperature. As shown in FIG. 2, when the mixture is at a temperature near the Sm-N* phase transition temperature ($T_{Sm-N*}$), the pitch of the mixture is gradually reduced from infinity (can be visualized as the pitch of the smectic phase) to a fixed pitch of the cholesteric phase. Thus, the mixture will have different pitches under different polymerization temperatures.

When the polymerization temperature and the thickness of the alignment layer containing the mixture are fixed, the Sm-N* phase transition temperature of the mixture will change along with the amount of the smectic liquid crystal polymerizable monomer, i.e. the changes in amount of the smectic liquid crystal polymerizable monomer will result in changes of the pitches, as well as the changes of the alignment direction correspondingly.

When the amount of the smectic liquid crystal polymerizable monomer in the mixture and the thickness of the polymer alignment layer are fixed, the direction of the polymer alignment layer depends on the polymerization temperature. When the polymerization temperature is lower than the Sm-N* phase transition temperature of the mixture by 3° C. or more, the mixture before polymerization is smectic; and in this case, the twisted arrangement of the liquid crystal molecules do not occur so that the primary alignment thereof is the same as that of the conventional layer, i.e. the alignment direction of the polymer alignment layer is the same as that of the conventional layer. Thus, as shown in FIG. 3(a), multi-domain display can not be formed. When the polymerization temperature is in the range of the Sm-N* phase transition temperature of the mixture ±3° C., the pitch of the mixture is larger and the twisted arrangement of the liquid crystal molecules occur due to the a smectic-cholesteric phase transition of the mixture, so that the alignment direction of the polymer alignment layer is different from that of the conventional layer, thereby achieving the multi-domain display, as shown in FIG. 3(b). When the polymerization temperature is higher than the Sm-N* phase transition temperature of the mixture by 3° C. or more, the mixture before polymerization is cholesteric; and in this case, the pitch of the mixture is smaller and the twisted arrangement of the liquid crystal molecules occur, so that the primary alignment of the polymer alignment layer is different from that of the conventional layer, i.e. the alignment direction of the polymer alignment layer is different from that of the conventional layer, thereby achieving the multi-domain display, as shown in FIG. 3(c).

When the amount of the smectic liquid crystal polymerizable monomer in the mixture and the polymerization temperature are fixed, i.e. the pitch (P) of the mixture is fixed, the alignment direction of the polymer alignment layer changes along with the thickness thereof. As shown in FIG. 4, the horizontal ordinate is the thickness of the alignment layer polymer, expressed in pitches of the mixtures, and the vertical ordinate is the angle between the alignment direction of the surface molecules in the alignment layer and the alignment direction of the first alignment layer (hereinafter, also referred to as "alignment angle"). The alignment angel changes for a corresponding angle along with the increasing of the thickness of the polymer alignment layer, and cycles from 0° to 360°.

When the thickness of the polymer alignment layer d is (n+0.25) P (n is an integer of zero or more), the alignment angle is 90°, as shown in FIG. 5(a). When the thickness of the polymer alignment layer d is (n+0.5) P (n is an integer of zero or more), the alignment angle is 180°, as shown in FIG. 5(b). When the thickness of the polymer alignment layer d is (n+0.75) P (n is an integer of zero or more), the alignment angle is 270°, as shown in FIG. 5(c). When the thickness of the polymer alignment layer d is nP (n is an integer of zero or more), the alignment angle is 360°, i.e. the alignment direction of the polymer alignment layer is the same as that of the conventional layer as shown in FIG. 5(d), and the liquid crystal display is shown in FIG. 10 in which multi-domain display can not be achieved. Therefore, the thickness d of the polymer alignment layer according to the present invention is 30-2000 nm, preferably 210-350 nm, meanwhile d is not an integer multiple of the pitch.

The present invention also provides a method for preparing a multi-domain display liquid crystal panel, comprising the following steps:

1) mixing a smectic liquid crystal polymerizable monomer, a cholesteric liquid crystal polymerizable monomer and a photoinitiator uniformly, applying the mixture onto a first alignment layer to form a liquid crystal mixture layer, and inducing a polymerization of the mixture uncovered with a mask so as to form a smectic/cholesteric liquid crystal polymer alignment layer by using masking treatment and ultraviolet light irradiation;

2) removing the monomer not being irradiated by ultraviolet light (i.e. the unreacted portion covered with the mask) with a solvent, so as to produce a plurality of polymer alignment modules, thereby obtaining a multi-domain display liquid crystal panel, as shown in FIG. 1 (3 in FIG. 1 indicates the surface alignment direction of the polymer alignment layer, 5 in FIG. 1 indicates the surface alignment direction of the first alignment layer).

In step 2), the solvent can be any solvent capable of dissolving and removing the unreacted polymerizable monomers, and for example, chloroform, methylene chloride or acetone can be exemplified.

In the present invention, a smectic/cholesteric liquid crystal polymer is formed from the mixture of liquid crystal polymerizable monomers having smectic phase (Sm)-cholesteric phase (N*) transition, and multiple liquid crystal alignments in a single pixel are formed by adjusting the polymerization temperature, the thickness of the polymer layer, and the amount of the smectic liquid crystal polymerizable monomer, thereby realizing a multi-domain display by the subsequent masking treatment and ultraviolet irradiation. The method for preparing a multi-domain display liquid crystal panel according to the present invention is simple, novel, low-cost, and easy to achieve.

DETAILED DESCRIPTION OF CERTAIN EMBODIMENTS

Hereinafter, the present invention will be described in detail with reference to the drawings and the examples below, but scope of the present invention is not limited thereto.

Example 1

Preparation of a Three-Domain Liquid Crystal Panel with an Alignment Angle of 45°

Figure 1:
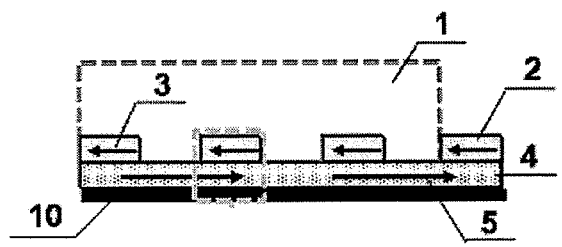
FIG. 1 is a schematic structural view of the liquid crystal panel according to the present invention.
Figure 2:
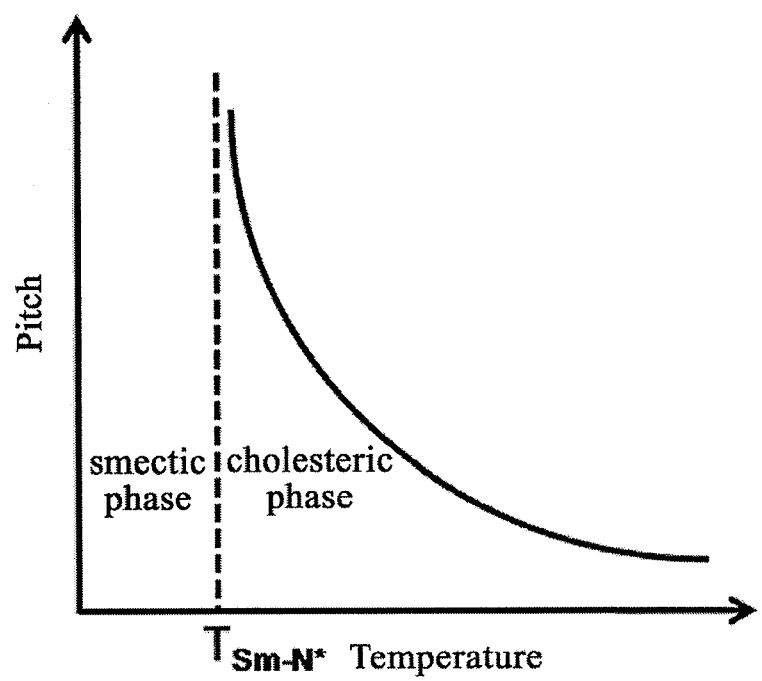
FIG. 2 is a graph showing the variation of the pitches of the mixture containing a smectic liquid crystal polymerizable monomer and a cholesteric liquid crystal monomer along with temperatures.
Figure 3:
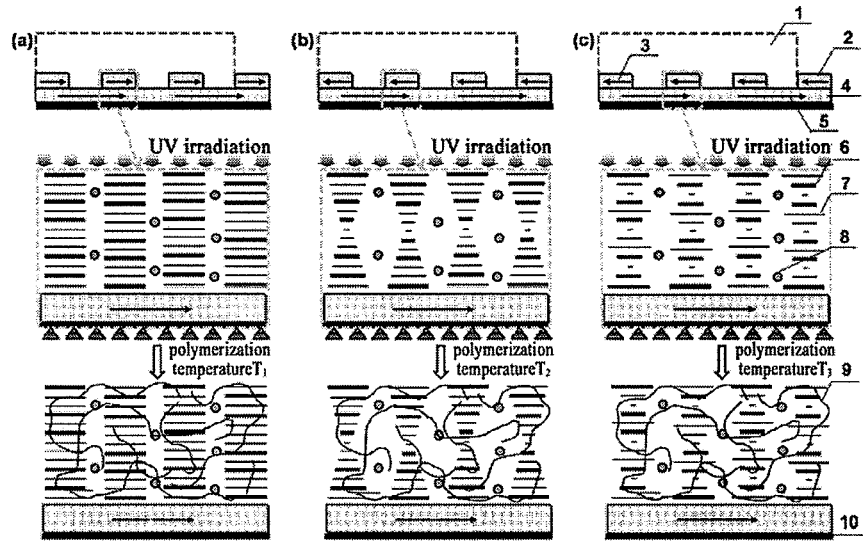
FIG. 3 are schematic views of the alignment directions of the smectic/cholesteric liquid crystal polymer alignment layer under different polymerization temperatures.
Figure 4:
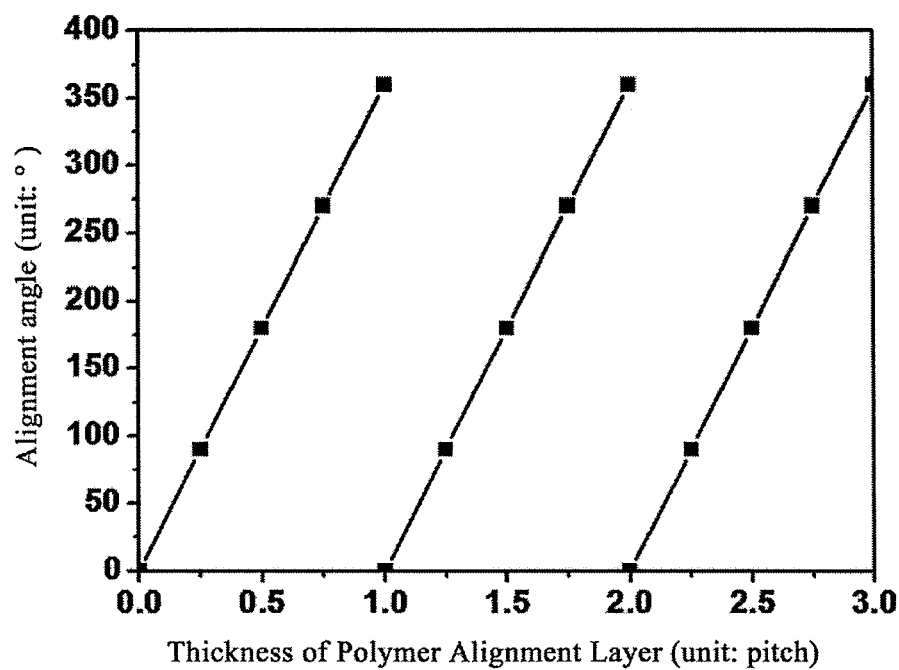
FIG. 4 is a graph showing the variation of the directions of the smectic/cholesteric liquid crystal polymer alignment layer along with the thickness of this alignment layer.
Figure 5:
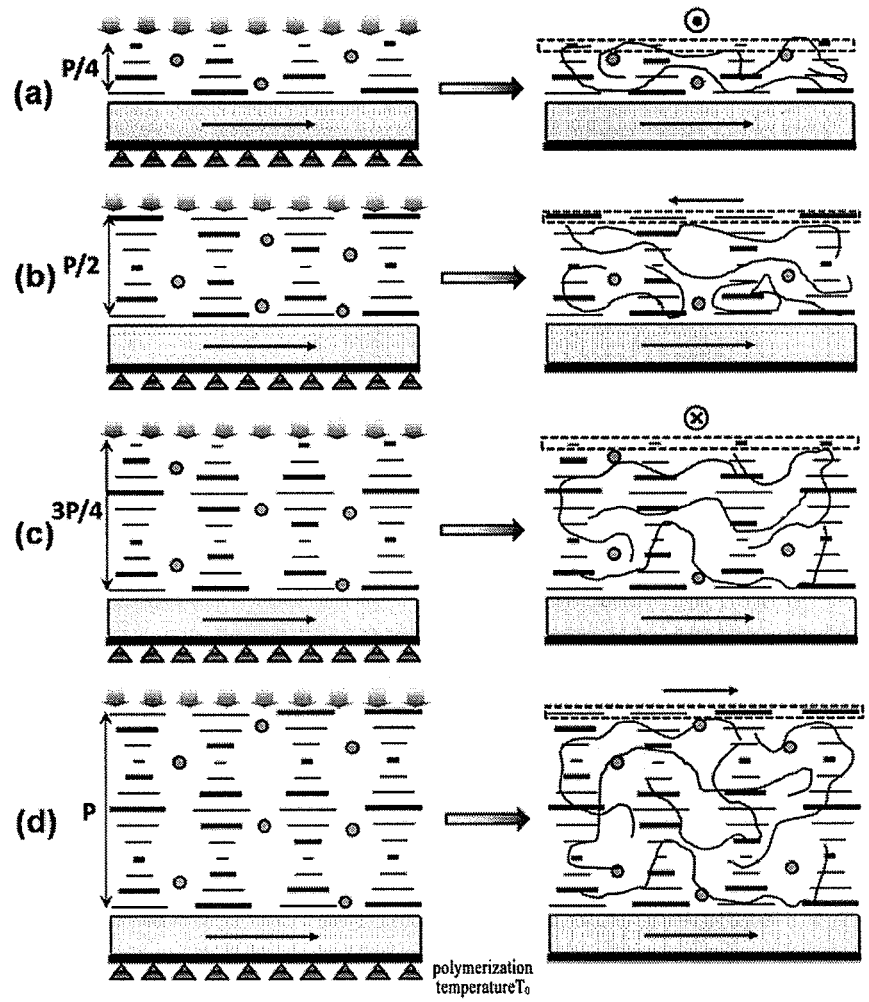
FIG. 5 are schematic views of the alignment directions of the smectic/cholesteric liquid crystal polymer alignment layer with different thickness.

In this example, the liquid crystal panel is prepared by assembling and aligning a CF (Color Filter) substrate and a TFT (Thin Film Filter) substrate, wherein the TFT substrate comprises a glass substrate 10, a first alignment layer 4, and a polymer alignment layer 2 having a alignment direction different from that of the first alignment layer, as shown in FIG. 1. The specific steps are as follows:

1) coating a PI (SE-6011, available from Nissan Corporation, Japan) alignment layer on a glass substrate 10, imparting it with a certain alignment direction by friction;

2) mixing 2-methylbutyl-4'-4-(6-(acryloyloxy)hexyloxy) benzoyloxy)biphenyl-4-carboxylate as a smectic liquid crystal polymerizable monomer, 1,4-bis(4-((3-methyl-6-acryloyloxy)hexyloxy)benzoyloxy)phenyl as a cholesteric liquid crystal polymerizable monomer, and benzoin dimethyl ether (available from BASF Corporation) as the photoinitiator uniformly in the mass ratio of 40.0:55.2:4.8.

The Sm-N* phase transition temperature $T_{Sm-N^*}$ of this mixture is 58° C., and the mixture has a pitch of 1700 nm at 56° C.

3) coating the mixture obtained in step 2) uniformly onto the surface of the PI alignment layer, and forming a polymer alignment layer having a thickness of 212.5 nm (0.125 P) through masking treatment and ultraviolet light irradiation.

The masking treatment was performed by dividing the liquid crystal mixture in each pixel uniformly into three portions and then disposing masks at intervals, such that three kinds of primary alignments of liquid crystal molecules in a single pixel can be formed in the subsequent steps.

Specifically, the ultraviolet light irradiation was performed by irradiating the substrate disposed with masks thereon by a ultraviolet light having a wavelength of 365 nm for 40 min, so that the smectic liquid crystal polymerizable monomer and the cholesteric liquid crystal polymerizable monomer in the irradiated portion undergoes a crosslink reaction to form a liquid crystal polymer, wherein the intensity of the ultraviolet light was 5 mw/cm$^2$, and the polymerization temperature was 56° C.

4) removing the smectic liquid crystal polymerizable monomer and the cholesteric liquid crystal polymerizable monomer not being irradiated by the ultraviolet light (unreacted) with methylene chloride (available from Beijing Chemical Reagent Co., Ltd.), so as to produce a polymer alignment layer on the first alignment layer, wherein the alignment angle between the liquid crystal polymer alignment layer and the first alignment layer is 45°, until then a TFT substrate with three-domain display, as shown in FIG. 6(b), is obtained;

5) assembling and aligning the TFT substrate obtained in step 4) with a CF substrate under vacuum, and then applying liquid crystal and sealant so as to prepare a liquid crystal panel with three-domain display.

In each pixel of this liquid crystal panel, the liquid crystal molecules directly contacting the PI alignment layer have a primary alignment the same as that of the PI alignment layer, and the liquid crystal molecules directly contacting the liquid crystal polymer alignment layer have a primary alignment in a direction forming an angle 45° with the PI alignment layer, such that three kinds of primary alignments of liquid crystal molecules are formed in a single pixel, thereby three-domain liquid crystal display is achieved.

Example 2

Preparation of a Six-Domain Liquid Crystal Panel with an Alignment Angle of 180°

In this example, the specific steps for preparing the liquid crystal panel are as follows:

1) coating a PVA (SE-6014, available from Nissan Corporation, Japan) alignment layer on a glass substrate, imparting it with a certain alignment direction by friction;

2) mixing 2-methylbutyl-4'-4-(6-(acryloyloxy)hexyloxy)benzoyloxy)biphenyl-4-carboxylate as a smectic liquid crystal polymerizable monomer, 1,4-bis(4-((3-methyl-6-acryloyloxy)hexyloxy)benzoyloxy)phenyl as a cholesteric liquid crystal polymerizable monomer, and benzoin dimethyl ether (available from BASF Corporation) as the photoinitiator uniformly in the mass ratio of 40.0:55.2:4.8.

The Sm-N* phase transition temperature $T_{Sm-N^*}$ of this mixture is 58° C., and the mixture has a pitch of 700 nm at 60° C.

3) coating the mixture obtained in step 2) uniformly onto the surface of the PVA alignment layer, and forming a polymer alignment layer having a thickness of 350 nm (0.5 P) through masking treatment and ultraviolet light irradiation.

The masking treatment was performed by dividing the liquid crystal mixture in each pixel uniformly into six portions and then disposing masks at intervals, such that six kinds of primary alignments of liquid crystal molecules in a single pixel can be formed in the subsequent steps.

Specifically, the ultraviolet light irradiation was performed by irradiating the substrate disposed with masks thereon by a ultraviolet light having a wavelength of 365 nm for 20 min, so that the smectic liquid crystal polymerizable monomer and the cholesteric liquid crystal polymerizable monomer in the irradiated portion undergoes a crosslink reaction to form a liquid crystal polymer, wherein the intensity of the ultraviolet light was 10 mw/cm$^2$, and the polymerization temperature was 60° C.

Figure 6:
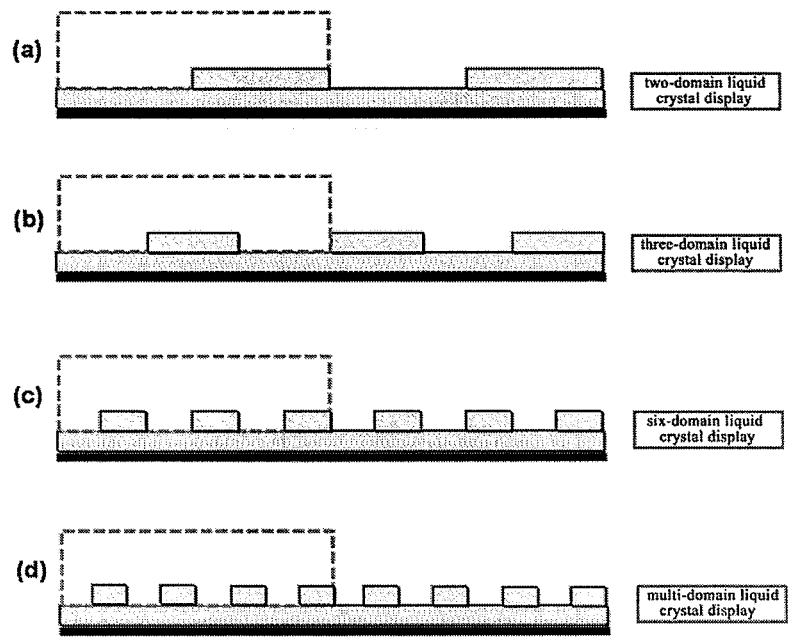
FIG. 6 are schematic views of the multi-domain liquid crystal displays wherein the alignment modules of the smectic/cholesteric liquid crystal polymer alignment layer have different sizes.
Figure 7:
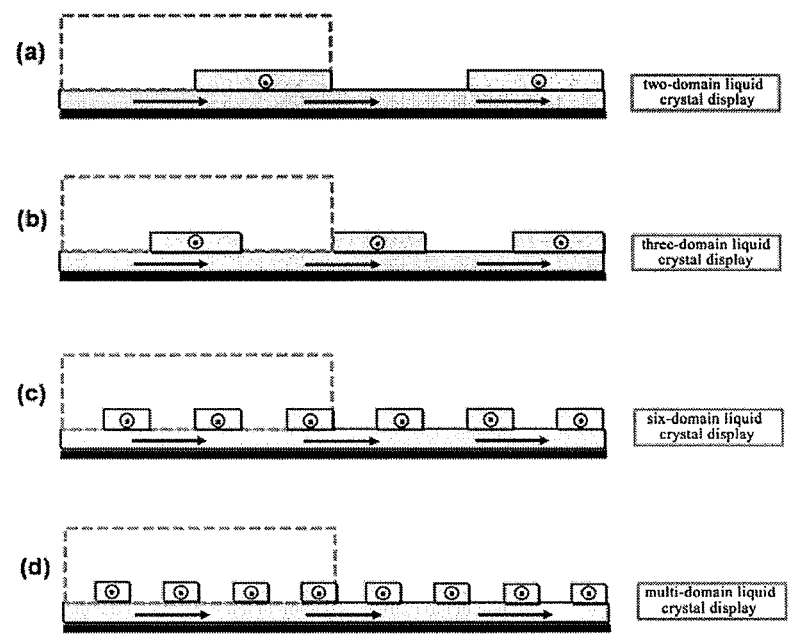
FIG. 7 are schematic views of the multi-domain liquid crystal displays wherein the smectic/cholesteric liquid crystal polymer alignment layer has a thickness as shown in FIG. 5(a).
Figure 8:
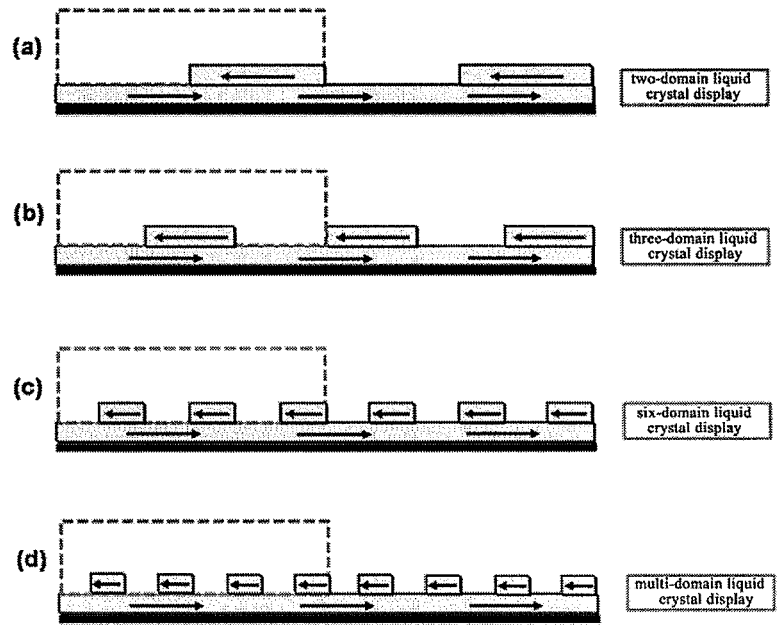
FIG. 8 are schematic views of the multi-domain liquid crystal displays wherein the smectic/cholesteric liquid crystal polymer alignment layer has a thickness as shown in FIG. 5(b).
Figure 9:
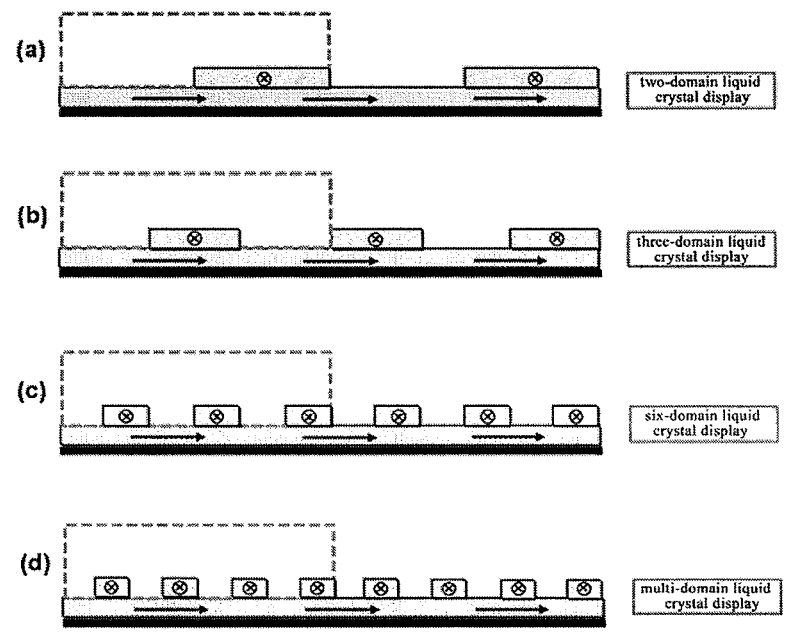
FIG. 9 are schematic views of the multi-domain liquid crystal displays wherein the smectic/cholesteric liquid crystal polymer alignment layer has a thickness as shown in FIG. 5(c).
Figure 10:
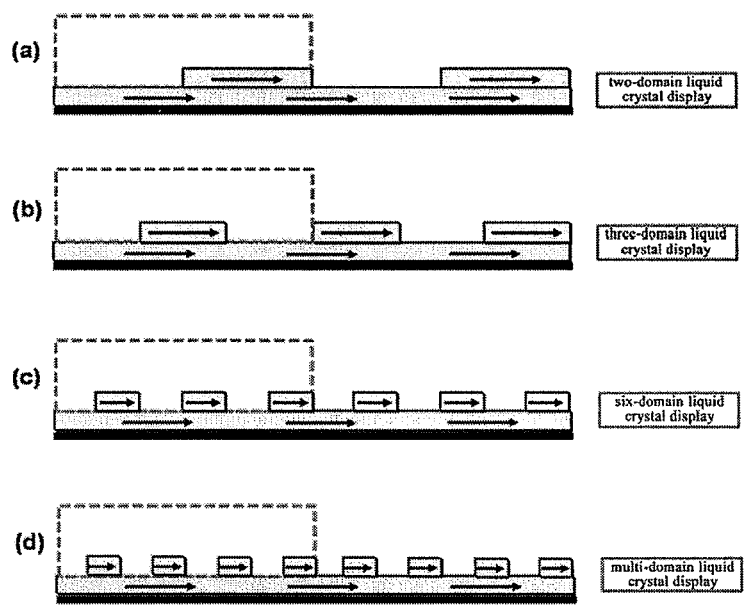
FIG. 10 are schematic views of the multi-domain liquid crystal displays wherein the smectic/cholesteric liquid crystal polymer alignment layer has a thickness as shown in FIG. 5(d).
Figure 11:
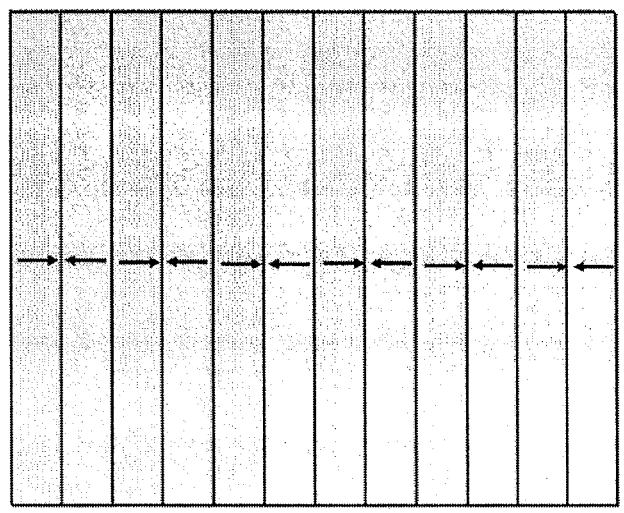
FIG. 11 is the top view of an example of multiple modules in a single pixel.

4) removing the smectic liquid crystal polymerizable monomer and the cholesteric liquid crystal polymerizable monomer not being irradiated by the ultraviolet light (unreacted) with methylene chloride (available from Beijing Chemical Reagent Co., Ltd.), so as to produce a polymer alignment layer on the PVA alignment layer, wherein the alignment angle between the liquid crystal polymer alignment layer and the PVA alignment layer is 180°, until then a TFT substrate with six-domain display, as shown in FIG. 6, is obtained;

5) assembling and aligning the TFT substrate obtained in step 4) with a CF substrate under vacuum, and then applying liquid crystal and sealant so as to prepare a liquid crystal panel with six-domain display.

In each pixel of this liquid crystal panel, the liquid crystal molecules directly contacting the PVA alignment layer have a primary alignment the same as that of the PVA alignment layer, and the liquid crystal molecules directly contacting the liquid crystal polymer alignment layer have a primary alignment in a direction forming an angle 180° with the PVA alignment layer, such that six kinds of primary alignments of liquid crystal molecules are formed in a single pixel, thereby six-domain liquid crystal display is achieved.

Example 3

Preparation of an Eight-Domain Liquid Crystal Panel with an Alignment Angle of 90°

In this example, the specific steps for preparing the liquid crystal panel are as follows:

1) coating a photo alignment layer RN3220 (available from Nissan Corporation, Japan) on a glass substrate, imparting it with a certain alignment direction by friction;

2) mixing 2-methylbutyl-4'-4-(6-(acryloyloxy)hexyloxy)benzoyloxy)biphenyl-4-carboxylate as a smectic liquid crystal polymerizable monomer, 1,4-bis(4-((3-methyl-6-acryloyloxy)hexyloxy)benzoyloxy)phenyl as a cholesteric liquid crystal polymerizable monomer, and benzoin dimethyl ether (available from BASF Corporation) as the photoinitiator uniformly in the mass ratio of 60.0:35.2:4.8.

The Sm-N* phase transition temperature $T_{Sm-N^*}$ of this mixture is 65° C., and the mixture has a pitch of 900 nm at 67° C.

3) coating the mixture obtained in step 2) uniformly onto the surface of the photo alignment layer, and forming a polymer alignment layer having a thickness of 225 nm (0.25 P) through masking treatment and ultraviolet light irradiation.

The masking treatment was performed by dividing the liquid crystal mixture in each pixel uniformly into eight portions and then disposing masks at intervals, such that eight kinds of primary alignments of liquid crystal molecules in a single pixel can be formed in the subsequent steps.

Specifically, the ultraviolet light irradiation was performed by irradiating the substrate disposed with masks thereon by a ultraviolet light having a wavelength of 365 nm for 10 min, so that the smectic liquid crystal polymerizable monomer and the cholesteric liquid crystal polymerizable monomer in the irradiated portion undergoes a crosslink reaction to form a liquid crystal polymer, wherein the intensity of the ultraviolet light was 30 mw/cm$^2$, and the polymerization temperature was 67° C.

4) removing the smectic liquid crystal polymerizable monomer and the cholesteric liquid crystal polymerizable monomer not being irradiated by the ultraviolet light (unreacted) with methylene chloride (available from Beijing Chemical Reagent Co., Ltd.), so as to produce a polymer alignment layer on the photo alignment layer, wherein the alignment angle between the liquid crystal polymer alignment layer and the photo alignment layer is 90°, until then a TFT substrate with eight-domain display is obtained;

5) assembling and aligning the TFT substrate obtained in step 4) with a CF substrate under vacuum, and then applying liquid crystal and sealant so as to prepare a liquid crystal panel with eight-domain display.

In each pixel of this liquid crystal panel, the liquid crystal molecules directly contacting the photo alignment layer have a primary alignment the same as that of the photo alignment layer, and the liquid crystal molecules directly contacting the liquid crystal polymer alignment layer have a primary alignment in a direction forming an angle 90° with the photo alignment layer, such that eight kinds of primary alignments of liquid crystal molecules are formed in a single pixel, thereby eight-domain liquid crystal display is achieved.

In addition, the TFT substrate in the above Example 1-3 can be replaced with a CF substrate, and then a multi-domain display CF substrate can be prepared in the same manner as Example 1-3.

It should be understood that the present invention is not limited to the above-illustrated embodiments, which were chosen and described in order to best explain the principles of the invention. Those skilled in the art can make various modifications or variations without departing from the spirit and essence of the present invention. It is intended that the scope of the invention be defined by the following claims and their equivalents.

The invention claimed is:

1. A multi-domain liquid crystal display panel characterized by comprising an upper substrate and a lower substrate, wherein at least one of the substrates includes a glass substrate, a first alignment layer coated on the surface of the glass substrate, and a polymer alignment layer having a different alignment direction from that of the first alignment layer; and the polymer alignment layer is made from a mixture of a smectic liquid crystal polymerizable monomer, a cholesteric liquid crystal polymerizable monomer and a photoinitiator.

2. The multi-domain liquid crystal display panel according to claim 1, characterized in that the polymer alignment layer is formed by coating the mixture of a smectic liquid crystal polymerizable monomer, a cholesteric liquid crystal polymerizable monomer and a photoinitiator on the first alignment layer, and followed by a masking treatment and ultraviolet light irradiation polymerization in sequence.

3. The multi-domain liquid crystal display panel according to claim 2, characterized in that the mass ratio of the smectic liquid crystal polymerizable monomer and the cholesteric liquid crystal polymerizable monomer is 20~80: 80~20.

4. The multi-domain liquid crystal display panel according to claim 2, characterized in that the mass of the photoinitiator is 4%~6% of the total mass of the smectic liquid crystal polymerizable monomer and the cholesteric liquid crystal polymerizable monomer.

5. The multi-domain liquid crystal display panel according to claim 2, characterized in that the smectic liquid crystal polymerizable monomer is 2-methylbutyl-4'-(4-(6-(acryloyloxy)hexyloxy)benzoyloxy)biphenyl-4-carboxylic ester represented by the following formula:

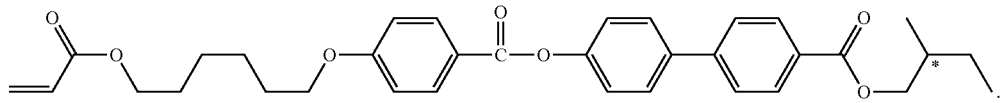

6. The multi-domain liquid crystal display panel according to claim 2, characterized in that the cholesteric liquid crystal polymerizable monomer is 1,4-bis(4-((3-methyl-6-acryloyloxy)hexyloxy)benzoyloxy)benzene represented by the following formula:

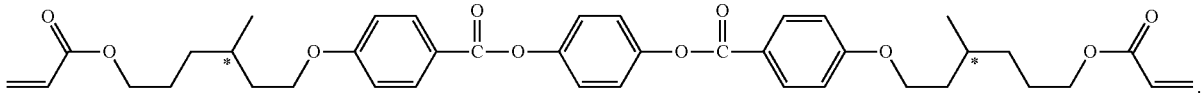

7. The multi-domain liquid crystal display panel according to claim 2, characterized in that the photoinitiator is benzoin dimethyl ether.

8. The multi-domain liquid crystal display panel according to claim 2, characterized in that the masking treatment is performed by dividing the liquid crystal mixture layer in a pixel uniformly into multiple modules and disposing masks at intervals so as to form different primary alignments of liquid crystal molecules in a pixel.

9. The multi-domain liquid crystal display panel according to claim 8, characterized in that the width of each module in the alignment layer containing a smectic/cholesteric liquid crystal polymer is designed to be 1/n of a single pixel, wherein n is an integer of 2~30.

10. The multi-domain liquid crystal display panel according to claim 2, characterized in that the UV irradiation conditions are: light intensity of 3~40 mw/cm$^2$, and duration of irradiation of 5-60 min.

11. The multi-domain liquid crystal display panel according to claim 2, characterized in that the polymerization temperature is $T_{Sm-N*}\pm 3°$ C. or in the temperature range that the mixture is in cholesteric state, wherein the $T_{Sm-N*}$ refers to the phase transition temperature of the mixture of the smectic liquid crystal polymerizable monomer, the cholesteric liquid crystal polymerizable monomer and the photoinitiator.

12. The multi-domain liquid crystal display panel according to claim 1, characterized in that the thickness d of the polymer alignment layer is 30-2000 nm.

13. A method for preparing the multi-domain liquid crystal display panel of claim 1, comprising the following steps:
  1) mixing the smectic liquid crystal polymerizable monomer, the cholesteric liquid crystal polymerizable monomer and the photoinitiator uniformly, applying the mixture onto the first alignment layer to form a liquid crystal mixture layer, and inducing a polymerization of the mixture uncovered with a mask so as to form the polymer alignment layer by using masking treatment and ultraviolet light irradiation;
  2) removing the monomer not being irradiated by ultraviolet light with a solvent, so as to produce a plurality of polymer alignment modules, thereby obtaining the multi-domain liquid crystal display panel.

14. The method for preparing a multi-domain liquid crystal display panel according to claim 13, characterized in that the mass ratio of the smectic liquid crystal polymerizable monomer and the cholesteric liquid crystal polymerizable monomer is 20~80:80~20.

15. The multi-domain liquid crystal display panel according to claim 13, characterized in that the mass of the photoinitiator is 4%~6% of the total mass of the smectic liquid crystal polymerizable monomer and the cholesteric liquid crystal polymerizable monomer.

16. The multi-domain liquid crystal display panel according to claim 13, characterized in that the masking treatment is performed by dividing the liquid crystal mixture layer in a pixel uniformly into multiple modules and disposing masks at intervals so as to form different primary alignments of liquid crystal molecules in a pixel.

17. The multi-domain liquid crystal display panel according to claim 13, characterized in that the width of each module in the alignment layer containing a smectic/cholesteric liquid crystal polymer is designed to be 1/n of a single pixel, wherein n is an integer of 2~30.

18. The multi-domain liquid crystal display panel according to claim 13, characterized in that the UV irradiation conditions are: light intensity of 3~40 mw/cm$^2$, and duration of irradiation of 5-60 min.

19. The multi-domain liquid crystal display panel according to claim 13, characterized in that the polymerization temperature is $T_{Sm-N*}\pm 3°$ C. or in the temperature range that the mixture is in cholesteric state, wherein the $T_{Sm-N*}$ refers to the phase transition temperature of the mixture of the smectic liquid crystal polymerizable monomer, the cholesteric liquid crystal polymerizable monomer and the photoinitiator.

20. The multi-domain liquid crystal display panel according to claim 13, characterized in that the thickness d of the polymer alignment layer is 30-2000 nm.

* * * * *